US006580568B2

United States Patent
Ozaki (10) Patent No.: US 6,580,568 B2
(45) Date of Patent: Jun. 17, 2003

(54) TELEPHOTO LENS SYSTEM (75) Inventor: Hiroyasu Ozaki, Tokyo (JP)

(73) Assignee: Pentax Corporation, Tokyo (JP)

( * ) Notice: Subject to any disclaimer, the term of this patent is extended or adjusted under 35 U.S.C. 154(b) by 15 days.

(21) Appl. No.: 09/921,897

(22) Filed: Aug. 6, 2001

(65) Prior Publication Data

US 2002/0041452 A1 Apr. 11, 2002

(30) Foreign Application Priority Data

Aug. 9, 2000 (JP) .................................. 2000-241711

(51) Int. Cl.$^7$ .............................................. G02B 13/02
(52) U.S. Cl. ....................................... 359/748; 359/745
(58) Field of Search .................... 359/745, 746, 359/747, 748

(56) References Cited

U.S. PATENT DOCUMENTS

| 4,793,698 A | * 12/1988 | Hirano | 359/476 |
| 5,325,234 A | 6/1994 | Yoneyama | 359/684 |
| 6,317,275 B1 | * 11/2001 | Yoneyama | 359/748 |
| 6,421,189 B1 | * 7/2002 | Sensui | 359/746 |
| 2002/0041452 A1 | * 4/2002 | Ozaki | 359/745 |
| 2002/0048092 A1 | * 4/2002 | Yoneyama | 359/745 |
| 2002/0097994 A1 | * 7/2002 | Yoneyama | 396/79 |

FOREIGN PATENT DOCUMENTS

| JP | 61-51117 | 3/1986 |
| JP | 10206729 | 8/1998 |

* cited by examiner

*Primary Examiner*—Hung Xuan Dang
*Assistant Examiner*—David N. Spector
(74) *Attorney, Agent, or Firm*—Greenblum & Bernstein, P.L.C.

(57) ABSTRACT

A telephoto lens system includes a positive first lens group, a negative second lens group and a positive third lens group. Upon focusing, the second lens group moves toward the image, and the telephoto lens system satisfies the following conditions: $1.35 < f/f_1 < 1.80$ ... (1); $1.30 < |f/f_2| < 1.85$ ... (2); $0.48 < f/f_3 < 0.75$ ... (3) and $0.10 < |L2/f_2| < 0.22$ ... (4); wherein f designates the focal length of the entire telephoto lens system; $f_1$ designates the focal length of the first lens group; $f_2$ designates the focal length of the second lens group; $f_3$ designates the focal length of the third lens group; and L2 designates the distance between the second lens group and the third lens group when an object at an infinite photographing distance is in an in-focus state.

7 Claims, 5 Drawing Sheets

-0.2    0.2
SPHERICAL
ABERRATION

CHROMATIC
ABERRATION

Fig.2B
W=6.7°

-0.02    0.02
LATERAL
CHROMATIC
ABERRATION

Fig.2C
W=6.7°

-0.2    0.2
ASTIGMATISM

Fig.2D
W=6.7°

-2.0 (%) 2.0
DISTORTION

-0.2    0.2
SPHERICAL
ABERRATION

CHROMATIC
ABERRATION

—— d Line
---- g Line
— - — C Line

Fig.4B
W=6.7°

-0.02   0.02
LATERAL
CHROMATIC
ABERRATION

Fig.4C
W=6.7°

-0.2    0.2
ASTIGMATISM

-2.0 (%) 2.0
DISTORTION

—— d Line
----- g Line
--- C Line

-0.2   0.2
SPHERICAL
ABERRATION

CHROMATIC
ABERRATION

Fig.6B
W=6.7°

-0.02   0.02
LATERAL
CHROMATIC
ABERRATION

-0.2   0.2
ASTIGMATISM

Fig.6D
W=6.7°

-2.0 (%) 2.0
DISTORTION

—— d Line
------ g Line
— — C Line

-0.2   0.2
SPHERICAL
ABERRATION

CHROMATIC
ABERRATION

Fig.8B
W=6.7°

-0.02   0.02
LATERAL
CHROMATIC
ABERRATION

-0.2   0.2
ASTIGMATISM

Fig.8D
W=6.7°

-2.0 (%) 2.0
DISTORTION

— d Line
--- g Line
---- C Line

— S
-- M

-0.2  0.2         -0.02  0.02       -0.2  0.2        -2.0 (%) 2.0
SPHERICAL         LATERAL           ASTIGMATISM      DISTORTION
ABERRATION        CHROMATIC
                  ABERRATION
CHROMATIC
ABERRATION

TELEPHOTO LENS SYSTEM

BACKGROUND OF THE INVENTION

1. Field of the Invention

The present invention relates to an inner-focusing telephoto lens system having a half angle-of-view of about 4° to 8°.

2. Description of the Related Art

An inner-focusing lens system in which a portion of the inner-lens groups (i.e., except the most object-side lens group) is moved in order to carry out a focusing operation (hereinafter, a focusing lens group) is suitable for an autofocus lens system. This is because the weight of the focusing lens group is light, thereby the load on the drive source is small. In particular, an inner-focusing lens system is preferable for a telephoto lens system since an increase in size of the optical system thereof, in theory, cannot be avoided.

However, the overall length of an inner-focusing lens system tends to become longer, because a space for allowing the focusing lens group to move has to be provided within the optical system. As a result, miniaturization of the inner-focusing lens system has been difficult, in comparison with an entire-advancing optical system and a front-group advancing optical system.

SUMMARY OF THE INVENTION

It is an object of the present invention to provide a small inner-focusing telephoto lens system having a half angle-of-view about 4° to 8°.

In order to achieve the above object, there is provided a telephoto lens system including a positive first lens group, a negative second lens group and a positive third lens group, in this order from the object. Upon focusing from infinity toward the shortest photographing distance, the second lens group moves toward the image, and the telephoto lens system satisfies the following conditions:

$$1.35 < f/f_1 < 1.80 \quad (1)$$

$$1.30 < |f/f_2| < 1.85 \quad (2)$$

$$0.48 < f/f_3 < 0.75 \quad (3)$$

and $$0.10 < |L2/f_2| < 0.22 \quad (4)$$

wherein f designates the focal length of the entire telephoto lens system;

$f_1$ designates the focal length of the first lens group;

$f_2$ designates the focal length of the second lens group;

$f_3$ designates the focal length of the third lens group; and

L2 designates the distance between the second lens group and the third lens group when an object at an infinite photographing distance is in an in-focus state.

In regard to condition (4), it is more preferable to satisfy the following condition:

$$-0.22 < L2/f_2 < -0.12 \quad (4')$$

More particularly, the first lens group includes a positive first lens element, a positive second lens element, and a negative third lens element, in this order from the object. The second lens group includes a negative fourth lens element and a positive fifth lens element, in this order from the object. The third lens group includes a positive sixth lens element and a negative seventh lens element, in this order from the object.

In the case that the lens system is constituted by the above seven lens elements, the following conditions are preferably satisfied:

$$30 < \upsilon_{p1-2} - \upsilon_{n3-4} \quad (5)$$

$$\theta_{n3-4} + 0.0016\upsilon_{n3-4} < 0.638 \quad (6)$$

wherein $\upsilon_{p1-2}$ designates the average Abbe numbers of the first and second lens elements;

$\upsilon_{n3-4}$ designates the average Abbe numbers of the third and fourth lens elements; and $\theta_{n3-4}$ designates the average partial dispersion ratios of the third and fourth lens elements indicated by the following equation:

$$\theta_n = (ng - nF)/(nF - nC);$$

$n\lambda$: $\lambda$=the refractive indices of the g-line, the F-line, and the C-line respectively.

A diaphragm is preferably provided on the image side of the second lens group. More specifically, the diaphragm can be provided either between the second lens group and third lens group, or within the third lens group.

The present disclosure relates to subject matter contained in Japanese Patent Application No. 2000-241711 (filed on Aug. 9, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

The present invention relates to a telephoto lens system having a half angle-of-view of about 4° to 8° which corresponds to a focal length of about 150 mm to 300 mm with respect to a 35 mm film. As shown in FIGS. 1, 3, 5, 7 and 9, the telephoto lens system includes a positive first lens group 10, a negative second lens group 20, and a positive third lens group 30, in this order from the object. Upon focusing from infinity toward the shortest photographing distance, the second lens group 20 moves, along the optical axis, toward the image. A diaphragm S is provided behind (i.e., on the image-side of) the second lens group 20, and fixed thereat, or provided in the third lens group 30, and fixed thereat.

In each of the first through fifth embodiments, the first lens group 10 includes a positive first lens element 10a, a positive second lens element 10b, and a negative third lens element 10c, in this order from the object. As shown in the three-lens-element arrangement of the first lens group 10, providing the negative third lens element 10c as the most image-side lens element can make the telephoto ratio smaller, and the weight of glass to be used in the first lens group 10 can be reduced.

The second lens group 20 is a focusing lens group. In each of the first through fifth embodiments, the second lens group 20 includes a negative fourth lens element 20a and a positive fifth lens element 20b, in this order from the object. As shown in the figures, in the case where the focusing lens group (the second lens group 20) is constituted by the two lens elements, focusing can be mainly carried out by the negative fourth lens element 20a, and aberrations occurred in the negative fourth lens element 20a is corrected by the positive fifth lens element 20b. Furthermore, it is preferable that the fourth lens element 20a is a negative lens element having a concave surface facing toward the image, and that the fifth lens element 20b is a positive meniscus lens element having a convex surface facing toward the object. According to this arrangement, aberration fluctuations caused by a change in the object distance can be minimized.

The third lens group 30 is provided to correct astigmatism and field curvature occurred in the first lens group 10 and the second lens group 20. In each of the first through fifth embodiments, the third lens group 30 includes a positive sixth lens element 30a and a negative seventh lens element 30b. According to this arrangement, the telephoto ratio can be made smaller by the negative seventh lens element 30b provided on the side of the image.

Figure 1:
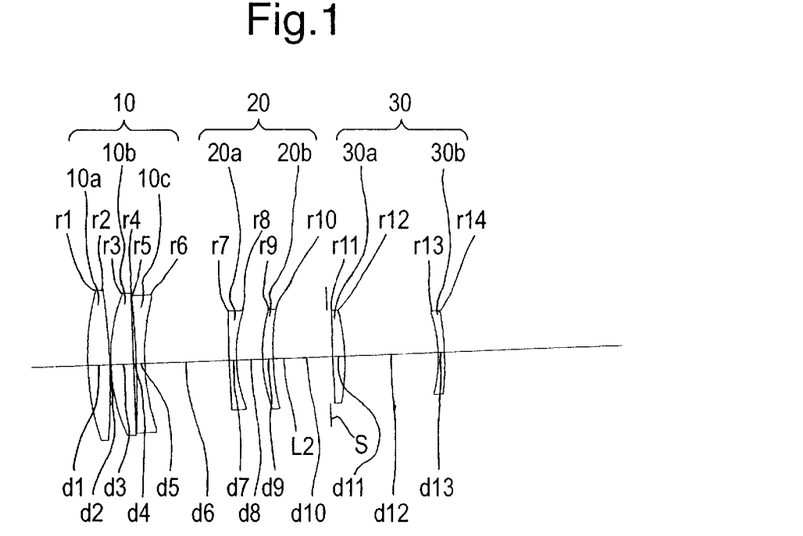
FIG. 1 shows a lens arrangement of the telephoto lens system according to a first embodiment of the present invention.
Figures 2A, 2B:
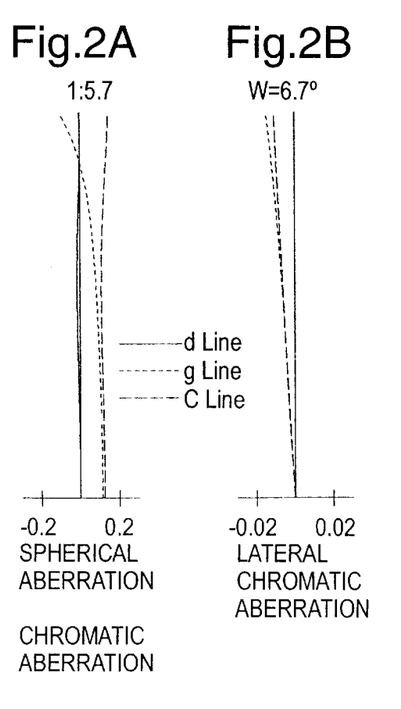
FIGS. 2A, 2B, 2C and 2D show aberrations occurred in the lens arrangement shown in FIG. 1.
Figure 2C:
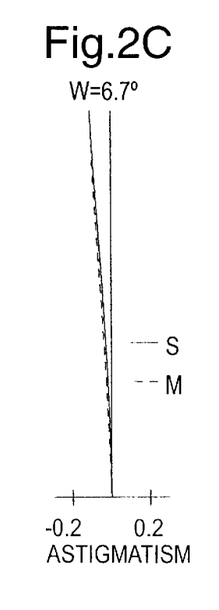
Figure 2D:
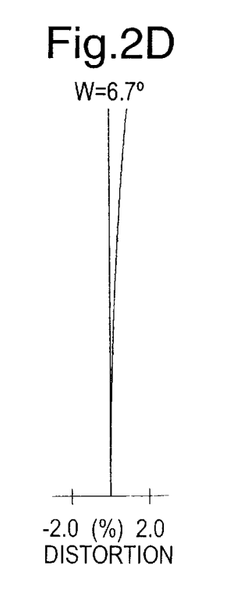
Figure 3:
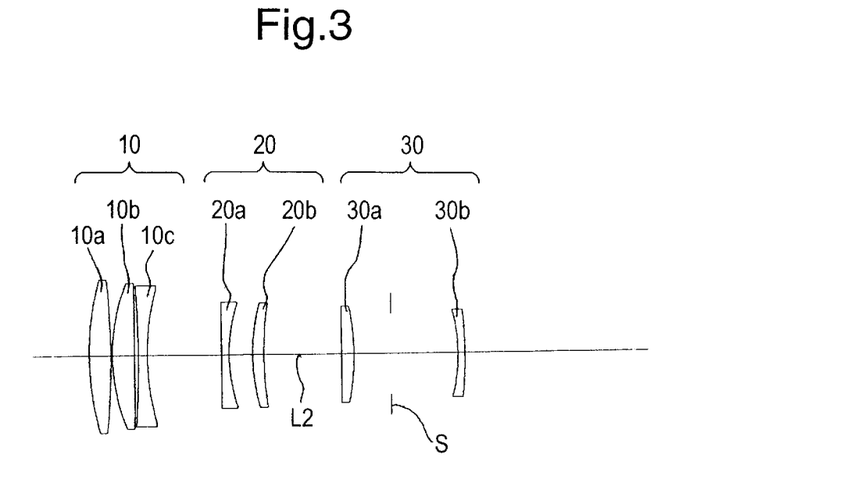
FIG. 3 shows a lens arrangement of the telephoto lens system according to a second embodiment of the present invention.
Figures 4A, 4B:
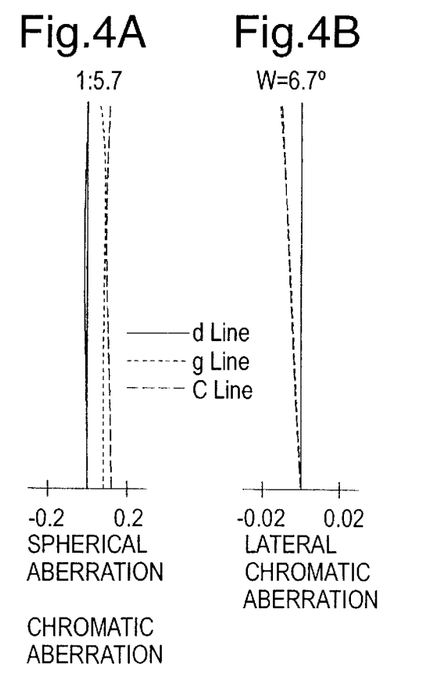
FIGS. 4A, 4B, 4C and 4D show aberrations occurred in the lens arrangement shown in FIG. 3.
Figure 4C:
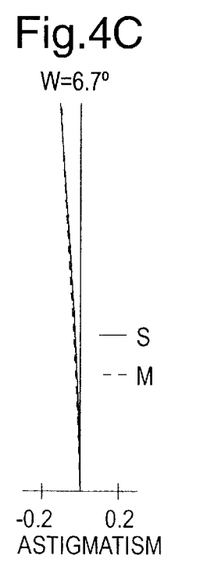
Figure 4D:
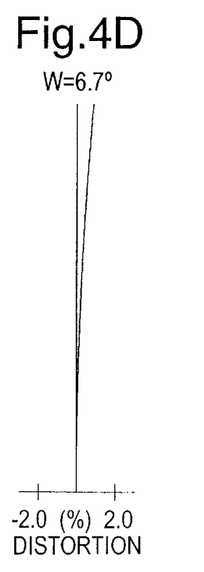
Figure 5:
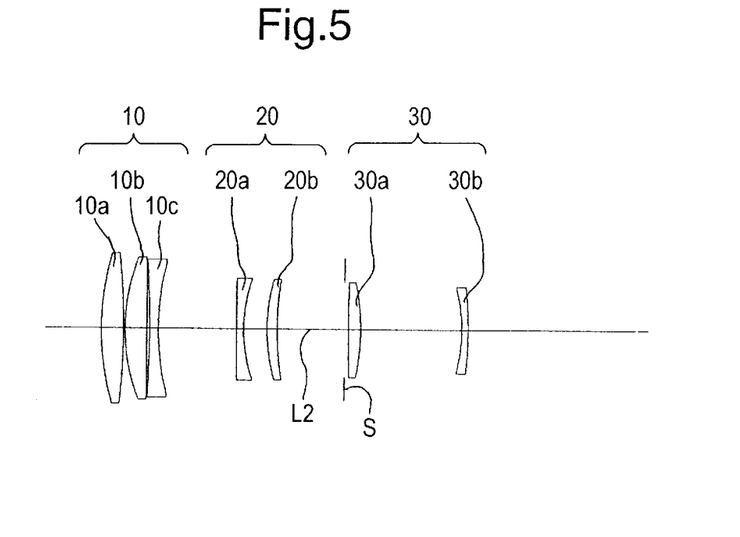
FIG. 5 shows a lens arrangement of the telephoto lens system according to a third embodiment of the present invention.
Figures 6A, 6B:
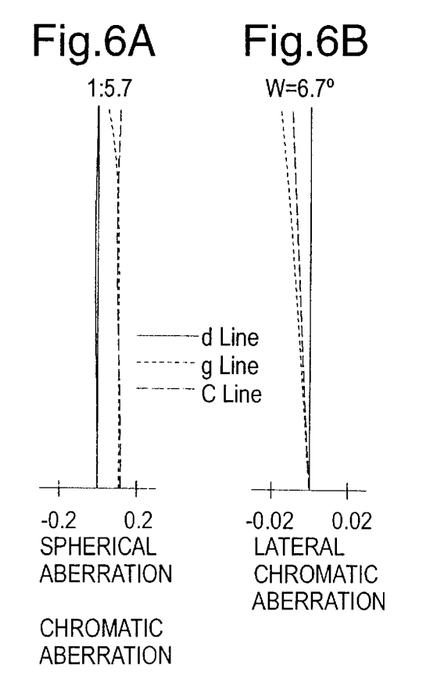
FIGS. 6A, 6B, 6C and 6D show aberrations occurred in the lens arrangement shown in FIG. 5.
Figure 6C:
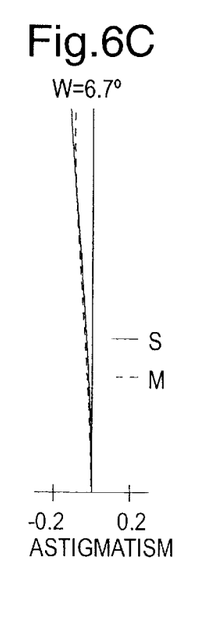
Figure 6D:
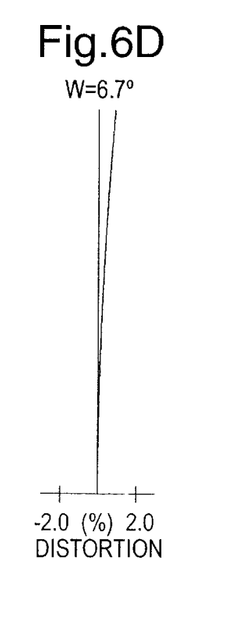
Figure 7:
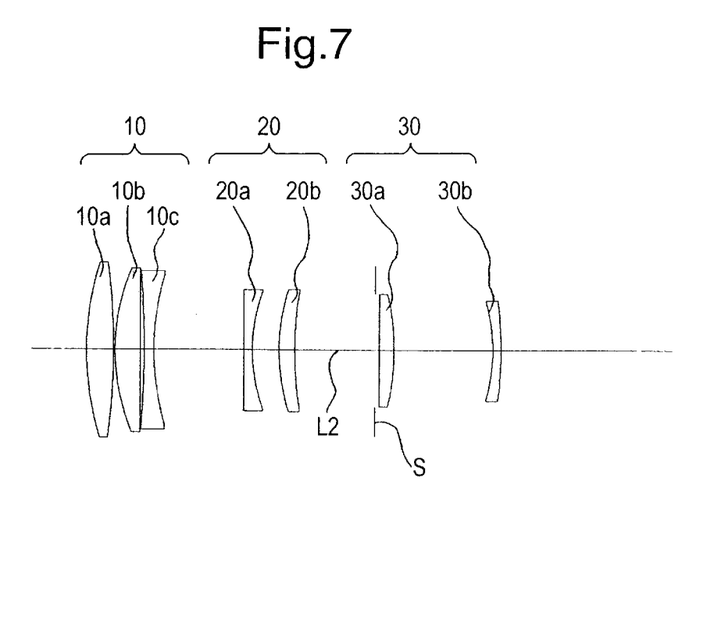
FIG. 7 shows a lens arrangement of the telephoto lens system according to a fourth embodiment of the present invention.
Figures 8A, 8B:
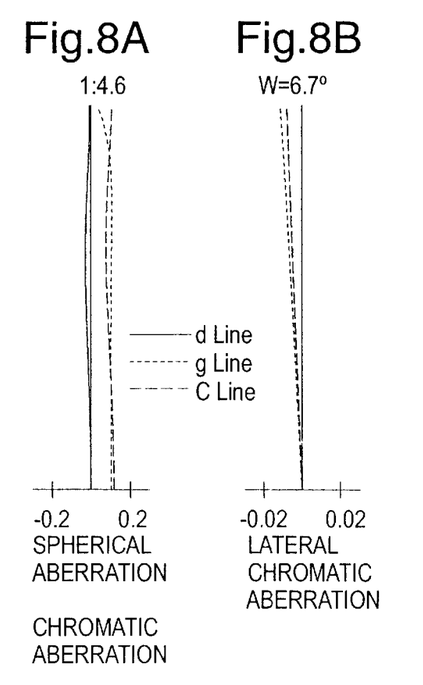
FIGS. 8A, 8B, 8C and 8D show aberrations occurred in the lens arrangement shown in FIG. 7.
Figure 8C:
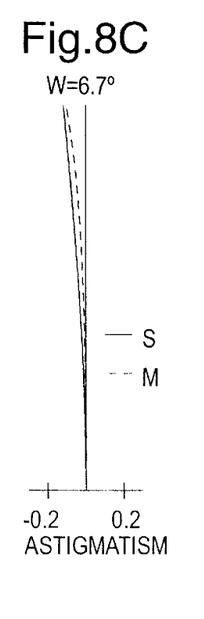
Figure 8D:
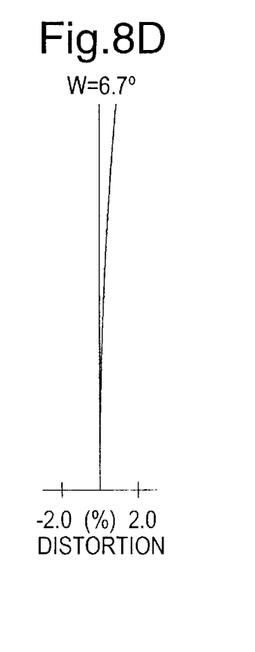
Figure 9:
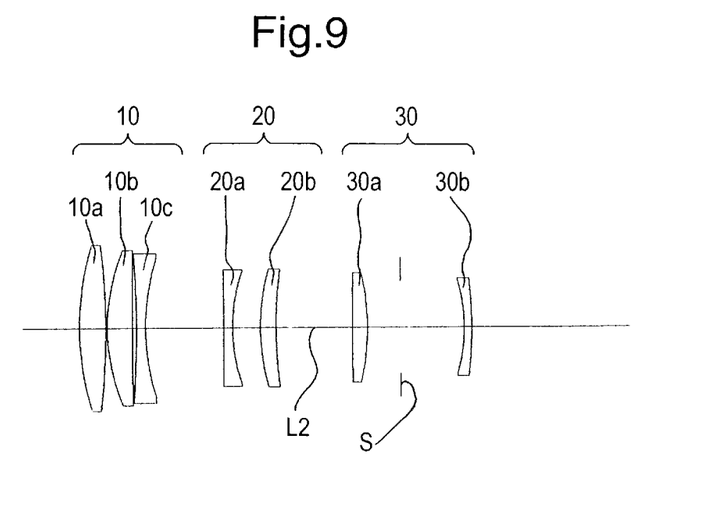
FIG. 9 shows a lens arrangement of the telephoto lens system according to a fifth embodiment of the present invention.
Figures 10A, 10B:
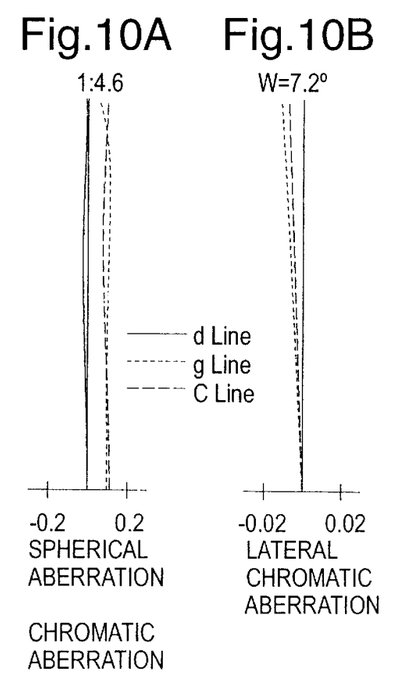
FIGS. 10A, 10B, 10C and 10D show aberrations occurred in the lens arrangement shown in FIG. 9.
Figure 10C:
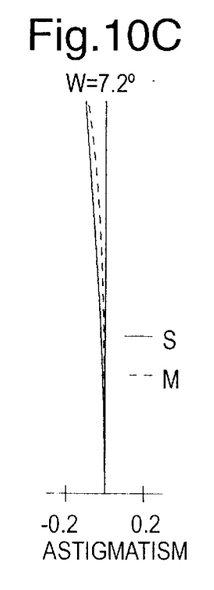
Figure 10D:
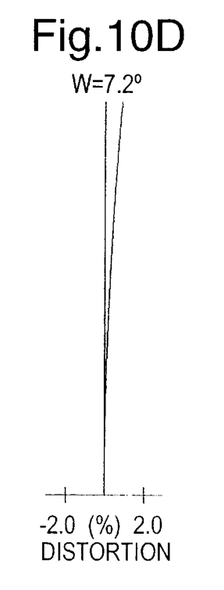

In each embodiment shown in shown FIGS. 1, 5 and 7, the diaphragm S is provided between the second lens group 20 and the third lens group 30, and in each embodiment shown in FIGS. 3 and 9, the diaphragm S is provided within the third lens group 30 (between the sixth lens element 30a and the seventh lens element 30b).

Condition (1) specifies the power of the first lens group 10, and relates to a high optical performance of the telephoto lens system and to miniaturization of the overall length thereof.

If $f/f_1$ exceeds the lower limit of condition (1), the power of the first lens group 10 becomes weaker, which is advantageous for the correcting of aberrations; however, the overall length of the telephoto lens system is made longer.

If $f/f_1$ exceeds the upper limit of condition (1), the power of the first lens group 10 becomes stronger, and it becomes possible to make the overall length of the lens system shorter; however, spherical aberrations and coma become noticeable.

Condition (2) specifies the power of the second lens group 20 in order to set an optimum power thereof as the focusing lens group.

If $|f/f_2|$ exceeds the lower limit of condition (2), the power of the second lens group 20 becomes weaker, it becomes difficult to make the telephoto ratio smaller, and the overall length of the telephoto lens is made longer.

If $|f/f_2|$ exceeds the upper limit of condition (2), the power of the second lens group 20 becomes stronger, and the traveling distance thereof at the time of focusing for an object at a closer distance can be made shorter; however, aberrations vary largely at a closer distance.

Condition (3) specifies the power of the third lens group 30.

If $f/f_3$ exceeds the lower limit of condition (3), the power of the third lens group 30 is made smaller, and the traveling distance of the second lens group 20 as the focusing lens group can be made shorter; however, the overall length of the lens system cannot be made shorter.

If $f/f_3$ exceeds the upper limit of condition (3), the power of the third lens group 30 becomes stronger, and accordingly, the focus-sensitivity of the second lens group 20 as the focusing lens group becomes weaker. As a result, the traveling distance of the second lens group 20 (upon focusing) becomes longer.

Condition (4) specifies the relation of the distance between the second lens group 20 and the third lens group 30 to the power of the second lens group 20. By satisfying this condition together with condition (2), the shortest photographing distance can be made shorter, while a sufficient traveling distance, upon focusing, of the second lens group 20 is maintained.

If $|L2/f_2|$ exceeds the lower limit of condition (4), the distance between the second lens group 20 and the third lens group 30 becomes shorter, so that a sufficient traveling distance of the second lens group 20 cannot be maintained, and the shortest photographing distance cannot be made shorter.

If $|L2/f_2|$ exceeds the upper limit of condition (4), the distance between the second lens group 20 and the third lens group 30 becomes longer, so that the overall length of the telephoto lens system cannot be made shorter.

By satisfying the above conditions (1) through (4), an inner-focusing-type telephoto lens system can be miniaturized.

Conditions (5) and (6) are to attain an optimum combination of glass materials of the positive first lens element, the positive second lens element, the negative third lens element and the negative fourth lens element, so that chromatic aberration which tends to occur in a telephoto lens system can be suitably corrected.

If $\upsilon_{p1-2} - \upsilon_{n3-4}$ exceeds the lower limit of condition (5), the difference in the Abbe numbers of the positive lens elements (first lens element 10a and second lens element 10b) and the negative lens elements (third lens element 10c and fourth lens element 20a) becomes smaller, so that the effect of the correcting of chromatic aberration becomes smaller.

If $\theta_{n3-4} + 0.0016\upsilon_{n3-4}$ exceeds the upper limit of condition (6), the degree of the anomalous dispersion characteristics of the glass materials used in the negative lens elements (third lens group 30 and fourth lens group 40) is lowered. As a result, the secondary spectrum increases.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire lens system, $f_1$ designates the focal length of the first lens group 10, $f_2$ designates the focal length of the second lens group 20, $f_3$ designates the focal length of the third lens group 30, $\theta_{n3}$ designates the partial dispersion ratio of the third lens group 30, $\theta_{n4}$ designates the partial dispersion ratio of the fourth lens group 40, W designates the half angle-of-view (°), $f_B$ designates the back focal distance, r designates the radius of curvature, d designates the lens-element thickness or distance between lens elements, Nd designates the refractive index of the d-line, and υ designates the Abbe number.

Embodiment 1

FIGS. 1 and 2A through 2D show the first embodiment of the telephoto lens system according to the present invention. FIG. 1 shows a lens arrangement thereof. FIGS. 2A through 2D show aberrations occurred in the lens arrangement shown in FIG. 1. Table 1 shows the numerical data of the first embodiment. The first lens group 10 includes a positive first lens element 10a, a positive second lens element 10b, and a negative third lens element 10c, in this order from the object. The second lens group 20 includes a negative fourth lens element 20a and a positive fifth lens element 20b, in this order from the object. The third lens group 30 includes a positive sixth lens element 30a and a negative seventh lens element 30b, in this order from the object. Upon focusing from infinity toward the shortest photographing distance, the second lens group 20 moves along the optical axis toward the image. The diaphragm S is fixed between the second lens group 20 and the third lens group 30.

TABLE 1

$F_{NO}$ = 1:5.7
f = 292.35
W = 6.7
$f_B$ = 116.66
$f_1$ = 171.522
$f_2$ = -177.212
$f_3$ = 577.291
$\theta_{n3}$ = 0.5774
$\theta_{n4}$ = 0.5703

| Surface No. | r | d | Nd | ν |
|---|---|---|---|---|
| 1 | 100.700 | 7.850 | 1.48749 | 70.2 |
| 2 | -249.207 | 0.300 | — | — |
| 3 | 65.656 | 8.220 | 1.49700 | 81.6 |
| 4 | -4951.776 | 0.990 | — | — |
| 5 | -355.189 | 3.100 | 1.66998 | 39.3 |
| 6 | 85.680 | 30.510 | — | — |
| 7 | 535.100 | 2.600 | 1.65412 | 39.7 |
| 8 | 50.460 | 9.630 | — | — |
| 9 | 58.000 | 3.810 | 1.80518 | 25.4 |
| 10 | 95.000 | 20.250 | — | — |
| Diaphragm | ∞ | 1.500 | — | — |
| 11 | 2639.805 | 4.440 | 1.56732 | 42.8 |
| 12 | -75.123 | 33.840 | — | — |
| 13 | -54.636 | 2.300 | 1.83400 | 37.2 |
| 14 | -118.500 | — | — | — |

Embodiment 2

FIGS. 3 and 4A through 4D show the second embodiment of the telephoto lens system, according to the present invention. FIG. 3 shows a lens arrangement thereof. FIGS. 4A through 4D show aberrations occurred in the lens arrangement shown in FIG. 3. Table 2 shows the numerical data of the second embodiment. The basic lens arrangement of the second embodiment is the same as the first embodiment except that the diaphragm S is provided between the positive sixth lens element 30a and the negative seventh lens element 30b, i.e., within the third lens group 30.

TABLE 2

$F_{NO}$ = 1:5.7
f = 292.49
W = 6.7
$f_B$ = 117.59
$f_1$ = 183.073
$f_2$ = -197.807
$f_3$ = 548.285
$\theta_{n3}$ = 0.5774
$\theta_{n4}$ = 0.5703

| Surface No. | r | d | Nd | ν |
|---|---|---|---|---|
| 1 | 104.239 | 7.848 | 1.48749 | 70.2 |
| 2 | -261.923 | 0.500 | — | — |
| 3 | 70.888 | 8.019 | 1.49700 | 81.6 |
| 4 | -2988.251 | 1.422 | — | — |
| 5 | -337.621 | 3.200 | 1.66998 | 39.3 |
| 6 | 92.178 | 26.855 | — | — |
| 7 | 3217.733 | 2.800 | 1.65412 | 39.7 |
| 8 | 58.862 | 8.611 | — | — |
| 9 | 70.270 | 4.039 | 1.80518 | 25.4 |
| 10 | 131.369 | 28.265 | — | — |
| 11 | 5471.285 | 4.463 | 1.61772 | 49.8 |
| 12 | -83.875 | 13.466 | — | — |
| Diaphragm | ∞ | 24.419 | — | — |
| 13 | -60.849 | 2.500 | 1.79952 | 42.2 |
| 14 | -152.822 | — | — | — |

Embodiment 3

FIGS. 5 and 6A through 6D show the third embodiment of the telephoto lens system, according to the present invention. FIG. 5 shows a lens arrangement thereof. FIGS. 6A through 6D show aberrations occurred in the lens arrangement shown in FIG. 5. Table 3 shows the numerical data of the third embodiment. The basic lens arrangement of the third embodiment is the same as the first embodiment.

TABLE 3

$F_{NO}$ = 1:5.7
f = 292.38
W = 6.7
$f_B$ = 117.64
$f_1$ = 179.182
$f_2$ = -185.397
$f_3$ = 504.821
$\theta_{n3}$ = 0.5774
$\theta_{n4}$ = 0.5703

| Surface No. | r | d | Nd | ν |
|---|---|---|---|---|
| 1 | 99.780 | 8.050 | 1.48749 | 70.2 |
| 2 | -254.587 | 0.500 | — | — |
| 3 | 71.700 | 7.900 | 1.49700 | 81.6 |
| 4 | -5402.519 | 1.080 | — | — |
| 5 | -330.000 | 3.100 | 1.66998 | 39.3 |
| 6 | 93.500 | 28.490 | — | — |
| 7 | 2009.993 | 2.600 | 1.65412 | 39.7 |
| 8 | 56.177 | 8.630 | — | — |
| 9 | 66.838 | 3.800 | 1.80518 | 25.4 |
| 10 | 120.600 | 24.960 | — | — |
| Diaphragm | ∞ | 1.500 | — | — |
| 11 | 2264.952 | 4.400 | 1.61772 | 49.8 |
| 12 | -82.500 | 37.020 | — | — |
| 13 | -60.633 | 2.300 | 1.83481 | 42.7 |
| 14 | -148.000 | — | — | — |

Embodiment 4

FIGS. 7 and 8A through 8D show the fourth embodiment of the telephoto lens system, according to the present invention. FIG. 7 shows a lens arrangement thereof. FIGS. 8A through 8D show aberrations occurred in the lens arrangement shown in FIG. 7. Table 4 shows the numerical data of the fourth embodiment. The basic lens arrangement of the fourth embodiment is the same as the first embodiment.

TABLE 4

$F_{NO} = 1:4.6$
$f = 292.50$
$W = 6.7$
$f_B = 114.42$
$f_1 = 199.116$
$f_2 = -209.951$
$f_3 = 452.265$
$\theta_{n3} = 0.5703$
$\theta_{n4} = 0.5774$

| Surface No. | r | d | Nd | ν |
|---|---|---|---|---|
| 1 | 108.293 | 9.800 | 1.48749 | 70.2 |
| 2 | −249.108 | 0.500 | — | — |
| 3 | 76.908 | 9.200 | 1.49700 | 81.6 |
| 4 | 4205.713 | 1.496 | — | — |
| 5 | −352.773 | 3.500 | 1.65412 | 39.7 |
| 6 | 93.820 | 32.767 | — | — |
| 7 | 2620.507 | 3.200 | 1.66998 | 39.3 |
| 8 | 61.255 | 9.822 | — | — |
| 9 | 74.668 | 5.800 | 1.80518 | 25.4 |
| 10 | 147.781 | 29.148 | — | — |
| Diaphragm | ∞ | 1.600 | — | — |
| 11 | 4057.146 | 5.400 | 1.64850 | 53.0 |
| 12 | −88.389 | 36.205 | — | — |
| 13 | −64.909 | 2.900 | 1.80440 | 39.6 |
| 14 | −157.044 | — | — | — |

Embodiment 5

FIGS. 9 and 10A through 10D show the fifth embodiment of the telephoto lens system, according to the present invention. FIG. 9 shows a lens arrangement thereof. FIGS. 10A through 10D show aberrations occurred in the lens arrangement shown in FIG. 9. Table 5 shows the numerical data of the fifth embodiment. The basic lens arrangement of the fifth embodiment is the same as the second embodiment.

TABLE 5

$F_{NO} = 1:4.6$
$f = 273.00$
$W = 7.2$
$f_B = 108.46$
$f_1 = 189.562$
$f_2 = -199.649$
$f_3 = 402.282$
$\theta_{n3} = 0.5703$
$\theta_{n4} = 0.5774$

| Surface No. | r | d | Nd | ν |
|---|---|---|---|---|
| 1 | 100.023 | 9.400 | 1.48749 | 70.2 |
| 2 | −253.508 | 0.500 | — | — |
| 3 | 70.468 | 9.100 | 1.49700 | 81.6 |
| 4 | 2057.722 | 1.435 | — | — |
| 5 | −361.236 | 3.400 | 1.65412 | 39.7 |
| 6 | 84.602 | 27.866 | — | — |
| 7 | 14526.827 | 3.100 | 1.66998 | 39.3 |
| 8 | 60.523 | 10.153 | — | — |
| 9 | 75.331 | 5.700 | 1.80518 | 25.4 |
| 10 | 152.136 | 27.858 | — | — |

TABLE 5-continued

| 11 | 1118.083 | 5.400 | 1.64850 | 53.0 |
|---|---|---|---|---|
| 12 | −86.435 | 12.114 | — | — |
| Diaphragm | ∞ | 22.813 | — | — |
| 13 | −62.331 | 2.700 | 1.80440 | 39.6 |
| 14 | −157.758 | — | — | — |

Table 6 shows the numerical values of each condition of each embodiment:

TABLE 6

|  | Embod.1 | Embod.2 | Embod.3 | Embod.4 | Embod.5 |
|---|---|---|---|---|---|
| Cond. (1) | 1.704 | 1.598 | 1.632 | 1.469 | 1.440 |
| Cond. (2) | 1.650 | 1.479 | 1.577 | 1.393 | 1.367 |
| Cond. (3) | 0.506 | 0.533 | 0.579 | 0.647 | 0.679 |
| Cond. (4) | 0.123 | 0.143 | 0.143 | 0.146 | 0.140 |
| Cond. (5) | 36.4 | 36.4 | 36.4 | 36.4 | 36.4 |
| Cond. (6) | 0.6371 | 0.6371 | 0.6371 | 0.6371 | 0.6371 |

As can be understood from Table 6, each embodiment satisfies each condition. Furthermore, as can be understood from the aberration diagrams, the aberrations can be adequately corrected.

According to the above description, a small innerfocusing telephoto lens system having a half angle-of-view about 4° to 8° can be obtained.

What is claimed is:

1. A telephoto lens system comprising a positive first lens group, a negative second lens group and a positive third lens group, in this order from an object,
   wherein upon focusing from infinity toward the shortest photographing distance, said second lens group moves toward an image, and
   wherein said telephoto lens system satisfies the following conditions:

$1.35 < f/f_1 < 1.80$ $1.30 < |f/f_2| < 1.85$ $0.48 < f/f_3 < 0.75$ $0.10 < |L2/f_2| < 0.22$ wherein
   f designates the focal length of said entire telephoto lens system;
   $f_1$ designates the focal length of said first lens group;
   $f_2$ designates the focal length of said second lens group;
   $f_3$ designates the focal length of said third lens group; and
   L2 designates the distance between said second lens group and said third lens group when an object at an infinite photographing distance is in an in-focus state.

2. The telephoto lens system according to claim 1, wherein said first lens group comprises a positive first lens element, a positive second lens element, and a negative third lens element, in this order from said object.

3. The telephoto lens system according to claim 1, wherein said second lens group comprises a negative fourth lens element and a positive fifth lens element, in this order from said object.

4. The telephoto lens system according to claim 1, wherein said third lens group comprises a positive sixth lens element and a negative seventh lens element, in this order from said object.

5. The telephoto lens system according to claim 1, satisfying the following conditions:

$$30 < \upsilon_{p1-2} - \upsilon_{n3-4}$$

$$\theta_{n3-4} + 0.0016\upsilon_{n3-4} < 0.638$$

wherein $\upsilon_{p1-2}$ designates the average Abbe numbers of said first and second lens elements;

$\upsilon_{n3-4}$ designates the average Abbe numbers of said third and fourth lens elements; and $\theta_{n3-4}$ designates the average partial dispersion ratios of said third and fourth lens elements indicated by the following equation:

$$\theta_n = (ng - nF)/(nF - nC);$$

$n\lambda$:$\lambda$=the refractive indices of the g-line, the F-line, and the C-line respectively.

6. The telephoto lens system according to claim 1, wherein a diaphragm is provided on the image side of said second lens group.

7. The telephoto lens system according to claim 6, wherein said diaphragm is provided either between said second lens group and said third lens group, or within said third lens group.

* * * * *